(12) United States Patent
Nagashima et al.

(10) Patent No.: US 8,926,200 B2
(45) Date of Patent: Jan. 6, 2015

(54) IMAGING DEVICE

(75) Inventors: Miyuki Nagashima, Osaka (JP); Yuya Yoneda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 182 days.

(21) Appl. No.: 13/363,335

(22) Filed: Jan. 31, 2012

(65) Prior Publication Data

US 2012/0251089 A1 Oct. 4, 2012

(30) Foreign Application Priority Data

Mar. 28, 2011 (JP) ................................ 2011-069567
Jan. 10, 2012 (JP) ................................ 2012-002562

(51) Int. Cl.
 G03B 17/00 (2006.01)
 H04N 5/225 (2006.01)
 G02B 7/02 (2006.01)
 G02B 7/10 (2006.01)

(52) U.S. Cl.
 CPC ....................................... *G02B 7/102* (2013.01)
 USPC ............................ 396/529; 348/374; 359/819

(58) Field of Classification Search
 USPC .................. 396/145, 535, 529; 348/373, 374; 359/819
 See application file for complete search history.

(56) References Cited

U.S. PATENT DOCUMENTS

| 7,259,923 B2 | 8/2007 | Nuno et al. | |
| 2006/0158750 A1* | 7/2006 | Takahashi | ...................... 359/819 |
| 2009/0040361 A1* | 2/2009 | Heim et al. | .................... 348/340 |

FOREIGN PATENT DOCUMENTS

| JP | 11-237654 A | 8/1999 |
| JP | 2005-164620 A | 6/2005 |
| JP | 2005-181463 A | 7/2005 |
| JP | 2008-111867 A | 5/2008 |
| JP | 2009-251474 A | 10/2009 |

* cited by examiner

*Primary Examiner* — Rochelle-Ann J Blackman
(74) *Attorney, Agent, or Firm* — Shinjyu Global IP

(57) ABSTRACT

An imaging device is provided that includes a first member, a flat second member, a lens barrel, and an elastic member. The first member defines a lens hole. The flat second member is disposed opposite to the first member. The lens barrel is disposed between the first and second members. The lens barrel includes a lens group disposed inside of the lens hole when the first member is viewed along the optical axis. The elastic member is configured to support the lens barrel. The elastic member is disposed between the first and second members, fixed to the lens barrel and the first member, and arranged to come into contact with the second member.

21 Claims, 12 Drawing Sheets

IMAGING DEVICE

CROSS-REFERENCE TO RELATED APPLICATIONS

This application claims priority under 35 U.S.C. §119 to Japanese Patent Application No. 2011-069567, filed on Mar. 28, 2011, and Japanese Patent Application No. 2012-002562, filed Jan. 10, 2012. The entire disclosure of Japanese Patent Applications No. 2011-069567 and Japanese Patent Application No. 2012-002562 are hereby incorporated herein by reference.

BACKGROUND

1. Technical Field

The technology disclosed herein relates to an imaging device with a lens barrel.

2. Background Information

One way that was known in the past to support a lens barrel of an imaging device (such as a digital camera) was to superpose a flat attachment member provided to the outer periphery of the lens barrel, an elastic member, and the device main body in that order along the optical axis direction, and screw the attachment member to the device main body (see, for example, Japanese Laid-Open Patent Application 2005-164620). With this method, external force exerted in the optical axis direction on the lens barrel can be absorbed by the elastic member, so less of the external force in the optical axis direction is transmitted directly from the lens barrel to the device main body.

SUMMARY

With the method discussed in Japanese Laid-Open Patent Application 2005-164620, however, a plurality of attachment members that are provided around the outer periphery of the lens barrel have to be fastened one by one to the device main body.

The technology disclosed herein was conceived in light of the above situation, and it is one object thereof to provide an imaging device that includes a lens barrel that is easy to assemble.

Accordingly, the imaging device disclosed herein comprises a first member, a flat second member, a lens barrel, and an elastic member. The first member defines a lens hole. The flat second member is disposed opposite to the first member. The lens barrel is disposed between the first and second members. The lens barrel includes a lens group disposed inside of the lens hole when the first member is viewed along the optical axis. The elastic member is configured to support the lens barrel. The elastic member is disposed between the first and second members, fixed to the lens barrel and the first member, and arranged to come into contact with the second member.

These and other objects, features, aspects and advantages of the present invention will become apparent to those skilled in the art from the following detailed description, which, taken in conjunction with the annexed drawings, discloses a preferred and example embodiments of the present invention.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

In the following embodiments, a digital camera will be given as an example of an "imaging device," but "imaging device" can also include, for example, silver halide cameras, video cameras, and various other kinds of optical device.

Also, in the following description, "front", "rear," "upper," "lower," "right," and "left" are terms defined using as a reference a digital camera in landscape orientation and directly facing a subject. "Landscape orientation" is the orientation of the digital camera when the long-side direction of the captured image substantially coincides with the horizontal direction in the captured image.

First Embodiment

Simplified Configuration of Digital Camera 1

Figure 1:
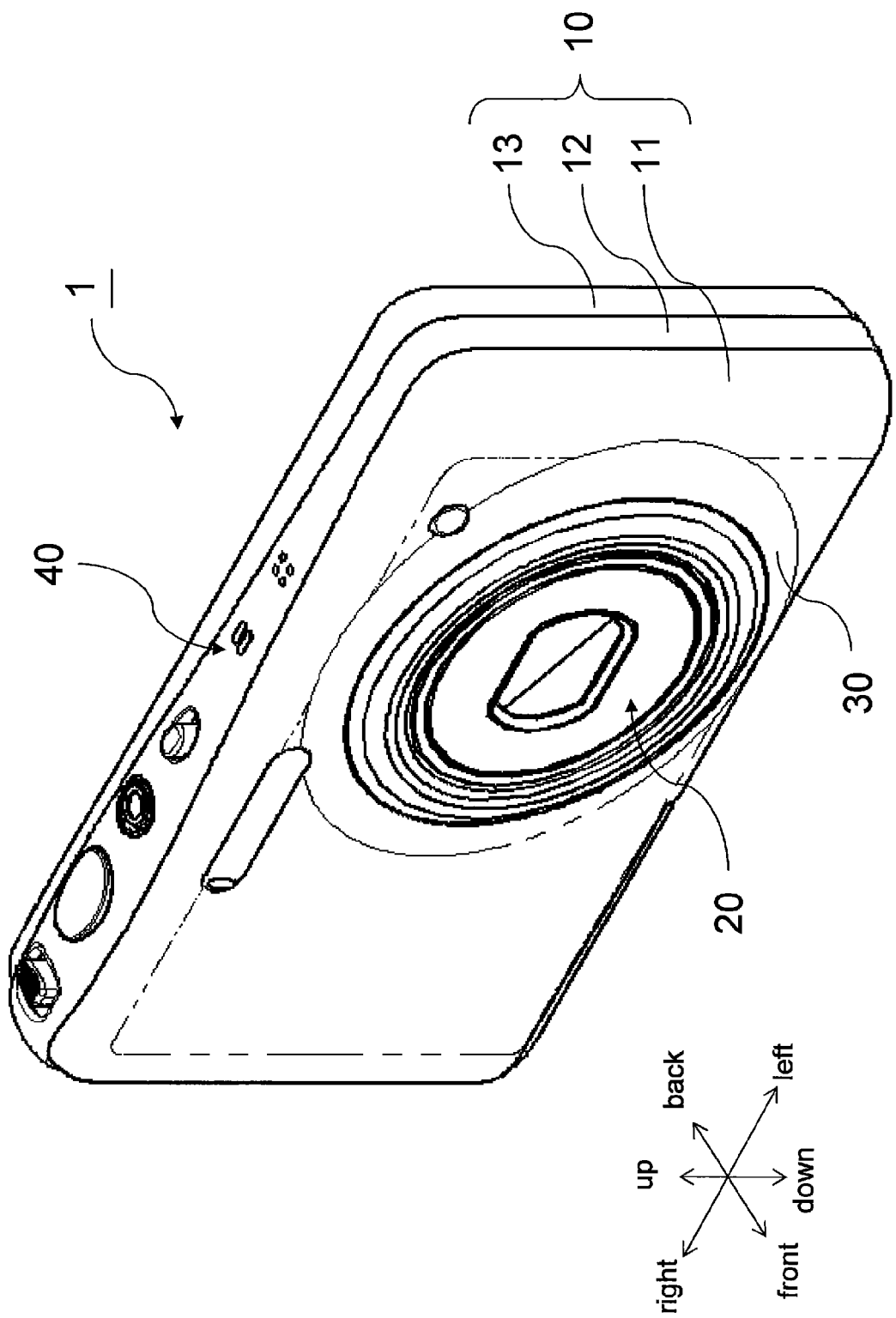
FIG. 1 is a front oblique view of a digital camera 1 according to a first embodiment.
Figure 2:
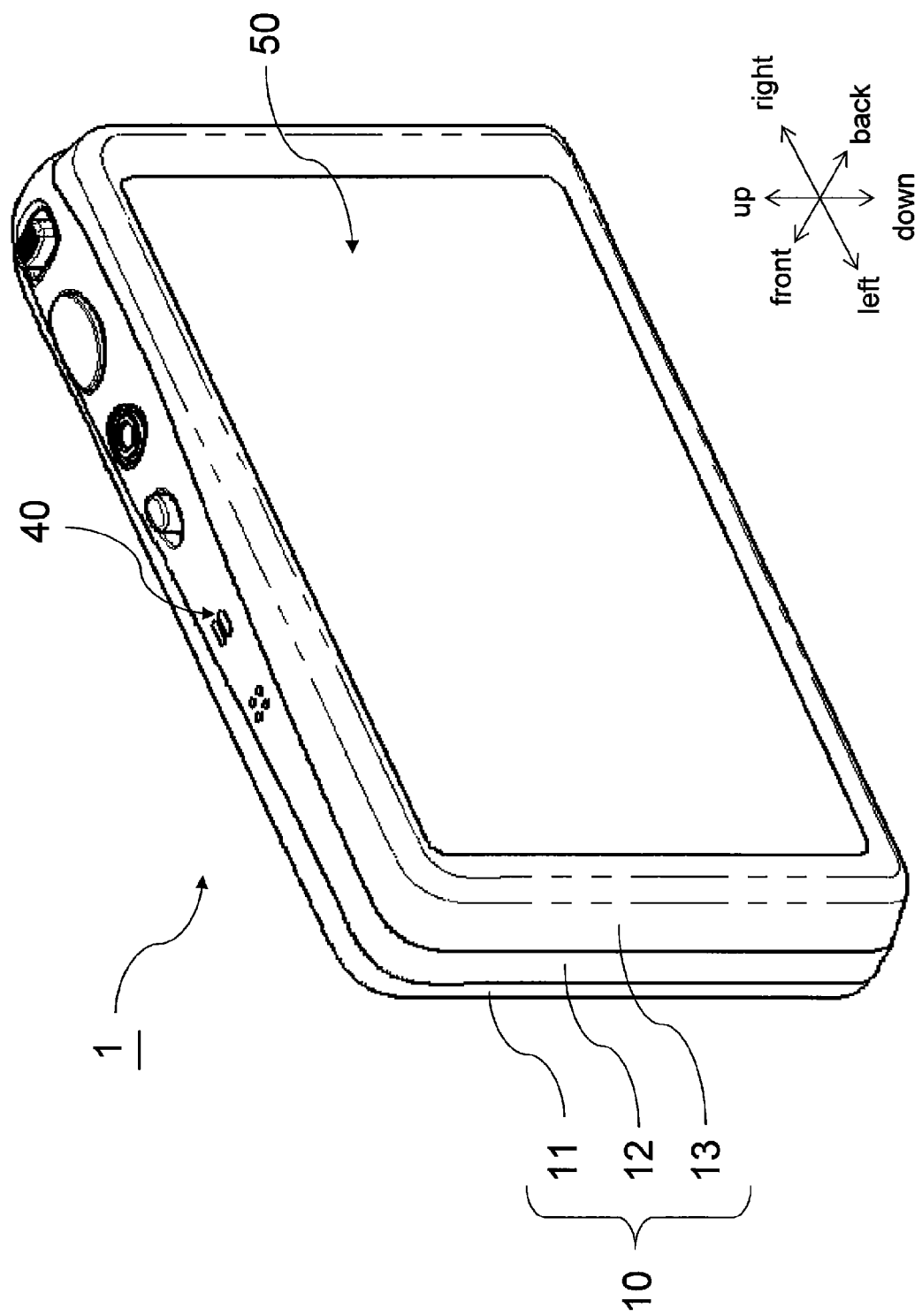
FIG. 2 is a rear oblique view of the digital camera 1 according to the first embodiment.

The digital camera 1 according to the first embodiment of the present invention will now be described through reference to the drawings. FIG. 1 is a front oblique view of the digital camera 1 according to the first embodiment. FIG. 2 is a rear oblique view of the digital camera 1 according to the first embodiment.

The digital camera 1 comprises a housing 10, a lens barrel 20, a lens panel 30, a microphone 40, and an LCD 50.

The housing 10 comprises a front panel 11, a center panel 12, and a rear panel 13. The front panel 11 is a flat exterior member, and has an opening through which the extendable lens barrel 20 passes when extending and retracting. The center panel 12 is a U-shaped exterior member. The center panel 12 is disposed between the front panel 11 and the rear panel 13. The rear panel 13 is an annular exterior member, and the LCD 50 is fitted within this ring.

The lens barrel 20 is able to extend and retract in the front-back direction. The lens barrel 20 sticks out forward from the opening in the front panel 11 when extended and is stowed inside of the opening in the front panel 11 when retracted. The configuration of the lens barrel 20 will be discussed below.

The lens panel 30 is an annular ornament that surrounds the lens barrel 20 on the front panel 11. The lens panel 30 is plated with resin, for example. The configuration of the lens panel 30 will be discussed below.

The microphone 40 is disposed in the interior of the housing 10. The microphone 40 converts external sound into an electrical signal during moving picture capture.

The LCD 50 is a monitor that displays the captured image.

Internal Configuration of Digital Camera 1

Figure 3:
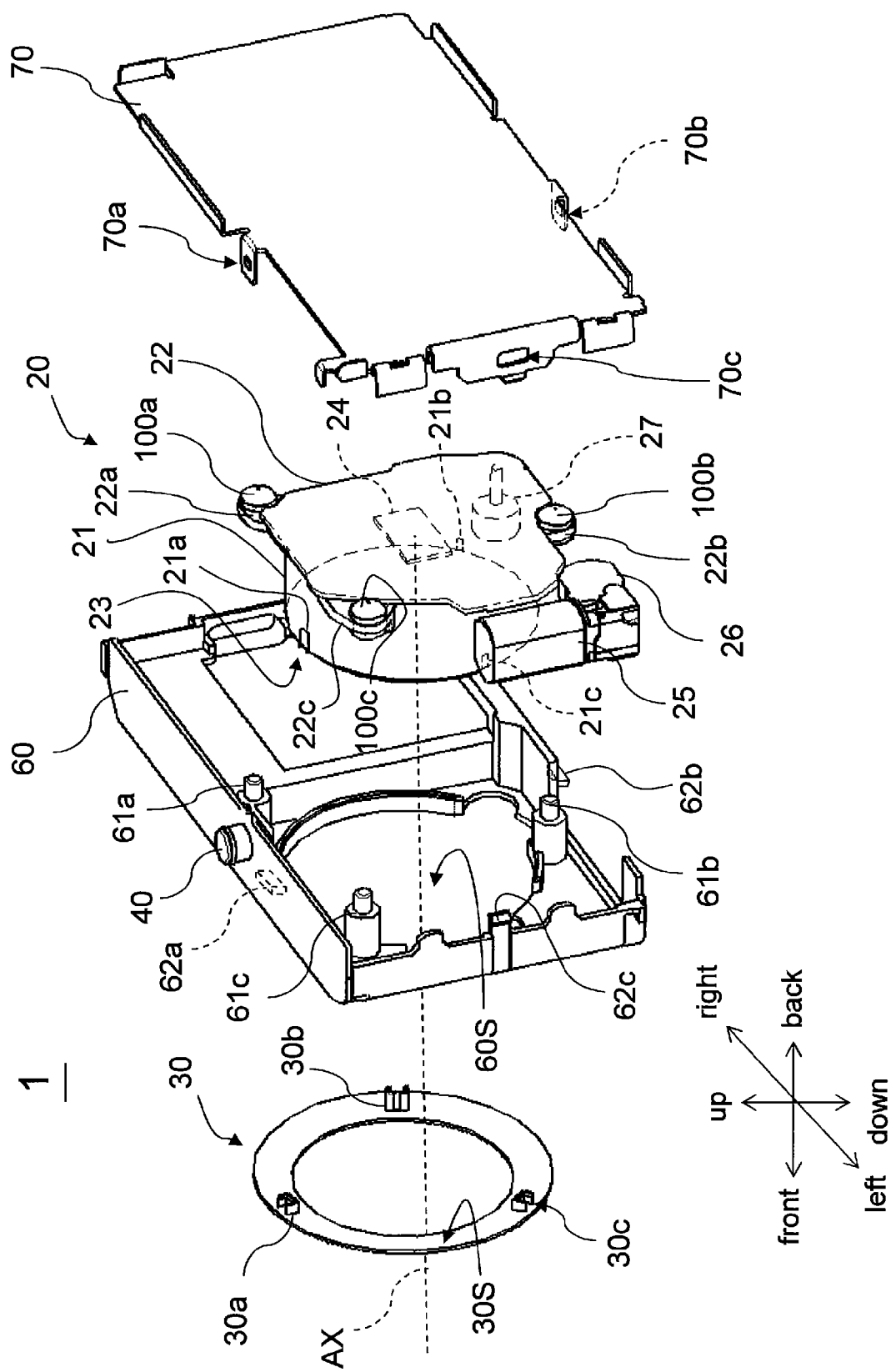
FIG. 3 is an exploded view of the internal configuration of the digital camera 1 according to the first embodiment.

Next, the internal configuration of the digital camera 1 will be described through reference to the drawings. FIG. 3 is an exploded view of the internal configuration of the digital camera 1.

As shown in FIG. 3, the digital camera 1 comprises the lens barrel 20, the lens panel 30, a frame 60, a frame plate 70, and first to third rubber caps 100a to 100c.

The lens barrel 20 has a cylindrical component 21, a fixing frame 22, a lens group 23, an imaging element 24, a zoom motor 25, a gearbox 26, and a focus motor 27. The lens barrel 20 is sandwiched between the frame 60 and the frame plate 70.

The cylindrical component 21 is able to extend and retract along the optical axis AX. The cylindrical component 21 has a first concave portion 21a, a second concave portion 21b, and a third concave portion 21c. The first to third concave portions 21a to 21c are formed around the outer peripheral face of the cylindrical component 21. The first to third concave portions 21a to 21c are disposed equidistantly spaced apart by 120 degrees in the circumferential direction around the optical axis AX.

The fixing frame 22 is a flat member that is connected to the rear side of the cylindrical component 21. The fixing frame 22 is disposed parallel to the frame plate 70. The fixing frame 22 is made of a material containing PC (polycarbonate) glass. The fixing frame 22 has a first attachment portion 22a, a second attachment portion 22b, and a third attachment portion 22c. The first to third attachment portions 22a to 22c are disposed substantially equidistantly spaced apart around the outer periphery of the fixing frame 22. Attachment holes 22S (see FIG. 5) for attaching the first to third rubber caps 100a to 100c are formed in the first to third attachment portions 22a to 22c.

The lens group 23 has one or more lenses, and forms an optical image of a subject. The lens group 23 is disposed on the inside of the lens hole 60S (discussed below) in planner view of the frame 60. The lens group 23 has the optical axis AX. The imaging element 24 is an opto-electrical conversion member that converts an optical image of the subject into an electrical signal. The zoom motor 25 supplies rotary force for extending and retracting the cylindrical component 21. The gearbox 26 adjusts the rotational speed of the zoom motor 25. The focus motor 27 supplies rotary force for driving the lens group 23.

The lens panel 30 is disposed on the frame 60 so as to cover the outer edge of a lens hole 60S. The lens panel 30 has an opposing face 30S, a first convex portion 30a, a second convex portion 30b, and a third convex portion 30c. The opposing face 30S is opposite the lens barrel and the frame 60. The first to third convex portions 30a to 30c are provided corresponding to the first to third concave portions 21a to 21c of the lens barrel 20, and are disposed substantially equidistantly spaced apart on the opposing face 30S. The first to third convex portions 30a to 30c are mated with the first to third concave portions 21a to 21c, respectively. This restricts movement of the lens barrel 20 in the up, down, left-right directions perpendicular to the optical axis AX.

The frame 60 forms the skeleton of the digital camera 1, and is molded component made from PC and ABS (acrylonitrile-butadiene-styrene) resin. The frame 60 is disposed in front of the lens barrel 20. Since the microphone 40 is fixed to the frame 60, vibration of the frame 60 could be inputted to the microphone 40 as mechanical noise. In view of this, in this embodiment, as will be discussed below, a structure is employed with which vibration during the extension and retraction of the lens barrel 20 is less likely to be transmitted from the lens barrel 20 to the frame 60.

The frame 60 has the lens hole 60S, a first boss pin 61a, a second boss pin 61b, a third boss pin 61c, a first linking prong 62a, a second linking prong 62b, and a third linking prong 62c. The lens barrel 20 is disposed on the inside of the lens hole 60S.

The first to third boss pins 61a to 61c are column-shaped convex portions that protrude toward the frame plate 70. The first to third boss pins 61a to 61c are provided corresponding to the first to third attachment portions 22a to 22c of the fixing frame 22, respectively, and are disposed substantially equidistantly spaced around the outer periphery of the lens hole 60S. The distal ends of the first to third boss pins 61a to 61c are inserted into the first to third rubber caps 100a to 100c, the result being that the frame 60 supports the lens barrel 20 at the front. The configuration of the first to third boss pins 61a to 61c will be discussed below.

The first linking prong 62a is disposed adjacent to the first boss pin 61a. The first linking prong 62a is formed substantially in the center of the frame 60 in the left-right direction (that is, the long-side direction of the frame 60). The first linking prong 62a is disposed on the upper side of the lens hole 60S, and overlaps the lens hole 60S in the up-down direction. The second linking prong 62b is disposed adjacent to the second boss pin 61b. The second linking prong 62b is disposed in the approximate center of the frame 60 in the left-right direction. The second linking prong 62b is also disposed on the lower side of the lens hole 60S, and overlaps the lens hole 60S in the up-down direction. The third linking prong 62c is disposed on the left side of the lens hole 60S. The third linking prong 62c overlaps the lens hole 60S in the left-right direction, and is disposed in the approximate center of the frame 60 in the up-down direction.

The frame plate 70 is a flat member with an oblong shape, which supports the LCD 50. The frame plate 70 is disposed to the rear of the lens barrel 20. The frame plate 70 comes into contact with the rear ends of the first to third rubber caps 100a to 100c, and thereby supports the lens barrel 20 at the rear. The frame plate 70 has a first linking hole 70a, a second linking hole 70b, and a third linking hole 70c. The first to third linking holes 70a to 70c are provided corresponding to the first to third linking prongs 62a to 62c. The first to third linking prongs 62a to 62c are connected to the first to third linking holes 70a to 70c.

The first to third rubber caps 100a to 100c are sandwiched between the frame 60 and the frame plate 70. The first to third rubber caps 100a to 100c are fixed to the frame 60 by inserting the first to third boss pins 61a to 61c from the front, and is placed in contact with the frame plate 70 from behind. Butyl rubber, for example, is favorable as the material for these first to third rubber caps 100a to 100c, but other materials can also be used. The configuration of the first to third rubber caps 100a to 100c will be discussed below.

Rubber Cap 100 Attachment Structure

Figure 4:
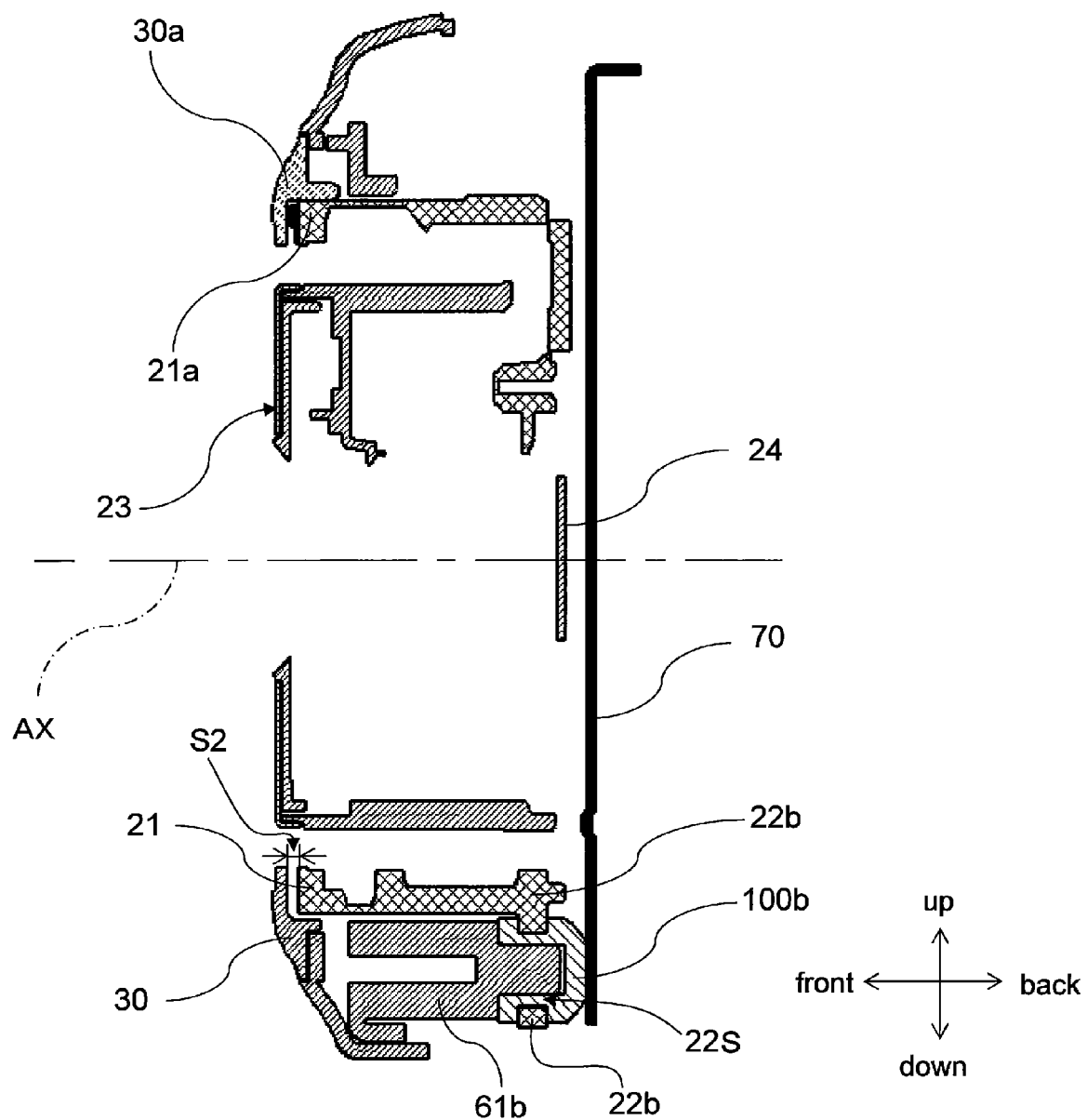
FIG. 4 is a cross section of the internal configuration of the digital camera 1 according to the first embodiment.
Figure 5:
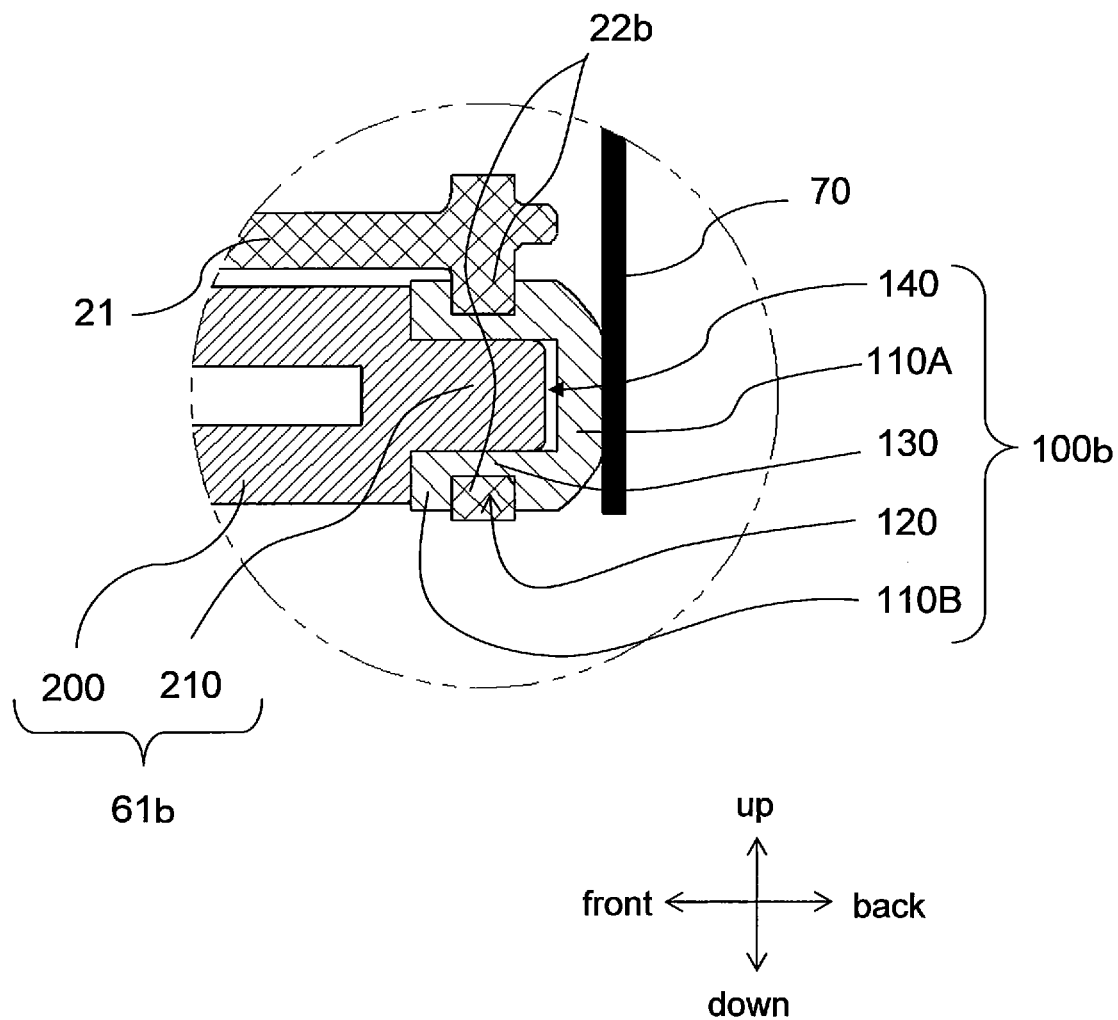
FIG. 5 is a detail view of FIG. 4.

The attachment structure for the rubber cap 100 will now be described through reference to the drawings. FIG. 4 is a cross section of the internal configuration of the digital camera 1. FIG. 5 is a detail view of FIG. 4. FIG. 4 shows a cross section that passes through the first concave portion 21a, the optical axis AX, and the second rubber cap 100b.

The first to third rubber caps 100a to 100c each have the same configuration, so just the second rubber cap 100b will be described below, and description of the first and third rubber caps 100a and 100c will be omitted.

The second rubber cap 100b is fitted on the inside of the attachment holes 22S of the second attachment portion 22b formed in the lens barrel 20. Also, the distal end of the second boss pin 61b formed in the lens barrel 20 is inserted in the second rubber cap 100b.

As shown in FIG. 5, the second rubber cap 100b has a first portion 110A, a second portion 110B, a constricted portion 120, an annular recess 130, and an insertion hole 140.

The first portion 110A is sandwiched between the frame plate 70 and the second attachment portion 22b of the lens barrel 20. The rear end of the first portion 110A hits the frame plate 70, which determines the rear position of the lens barrel 20 and restricts the lens barrel 20 from shifting to the rear.

The second portion 110B is sandwiched between the second boss pin 61b and the second attachment portion 22b. The front end of the second portion 110B hits a boss main body 200 of the second boss pin 61b, which determines the front position of the lens barrel 20 and restricts the lens barrel 20 from shifting to the front.

The constricted portion 120 is formed between the first portion 110A and the second portion 110B, and communicates with the first portion 110A and the second portion 110B. The second rubber cap 100b is fitted in the attachment holes 22S of the second attachment portion 22b at the narrowed constricted portion 120.

The annular recess 130 is formed between the first portion 110A and the second portion 110B around the constricted portion 120. The annular recess 130 is fitted to the attachment holes 22S of the second attachment portion 22b, which is formed in an annular shape.

The insertion hole 140 is formed in the front-back direction along the optical axis AX in the interior of the second rubber cap 100b (the first portion 110A, the second portion 110B, and the constricted portion 120).

The second boss pin 61b here has the boss main body 200 and a distal end portion 210. The boss main body 200 supports the front end of the second portion 110B. This determines the front position of the lens barrel 20. The distal end portion 210 is a column-shaped member that protrudes from the boss main body 200 toward the frame plate 70 side. The distal end of the distal end portion 210 is located closer to the frame plate 70 than the second attachment portion 22b. Accordingly, the distal end portion 210 is disposed on the inside of the attachment holes 22S, and is surrounded by the second attachment portion 22b via the second rubber cap 100b. The distal end portion 210 is inserted into the insertion hole 140 of the second rubber cap 100b. This determines the up-down and left-right position of the lens barrel 20, and restricts the lens barrel 20 from becoming offset in a direction perpendicular to the optical axis AX.

In this embodiment, a gap is provided between the distal end of the distal end portion 210 and the bottom face of the insertion hole 140.

Assembling Method of Lens Barrel 20

Next, the assembling method of the lens barrel 20 will be described through reference to the drawings. FIGS. 6 to 9 are diagrams illustrating how the lens barrel 20 is assembled.

Figure 6:
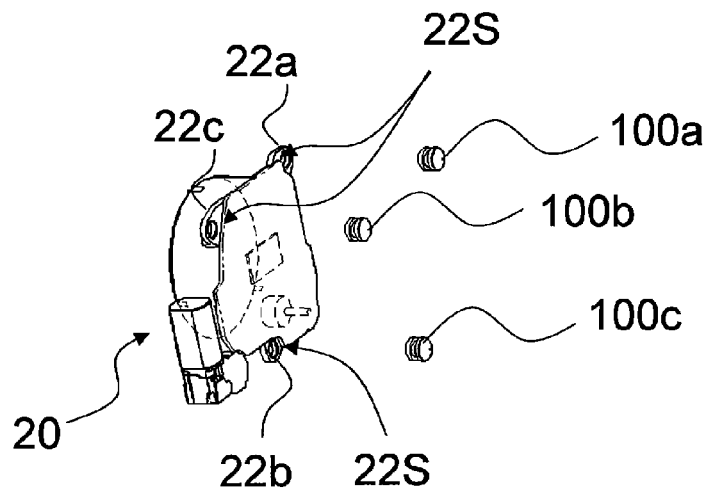
FIG. 6 is a diagram illustrating a method for assembling a lens barrel 20 according to the first embodiment.

First, as shown in FIG. 6, the first to third rubber caps 100a to 100c are fitted in the attachment holes 22S of the first to third attachment portions 22a to 22c had by the lens barrel 20.

Figure 7:
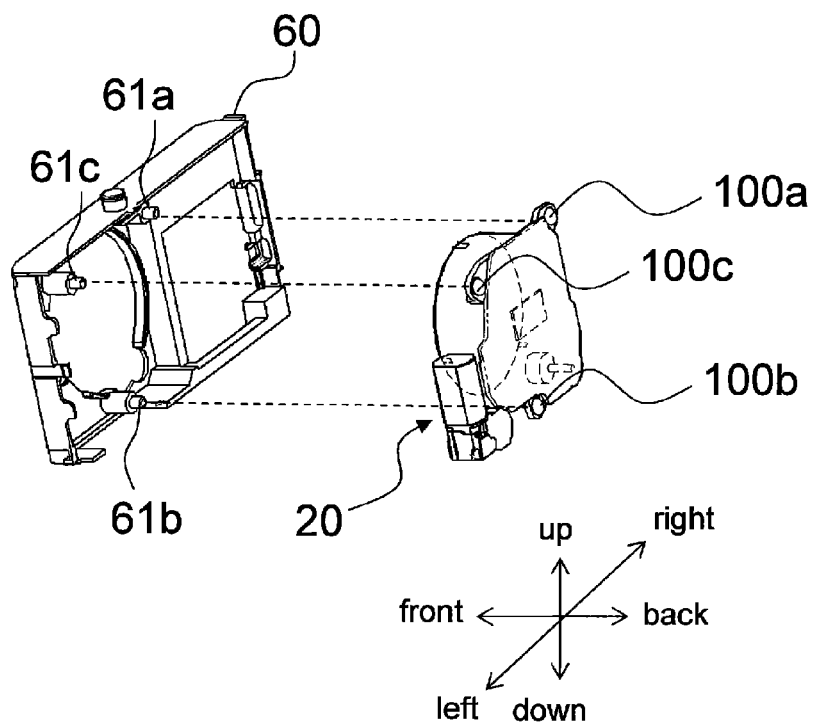
FIG. 7 is a diagram illustrating a method for assembling a lens barrel 20 according to the first embodiment.

Then, as shown in FIG. 7, the distal ends of the first to third boss pins 61a to 61c formed in the frame 60 are pushed into the first to third rubber caps 100a to 100c. This results in a state in which the lens barrel 20 is supported by the frame 60 via the first to third rubber caps 100a to 100c, and determines the front position of the lens barrel 20.

Figure 8:
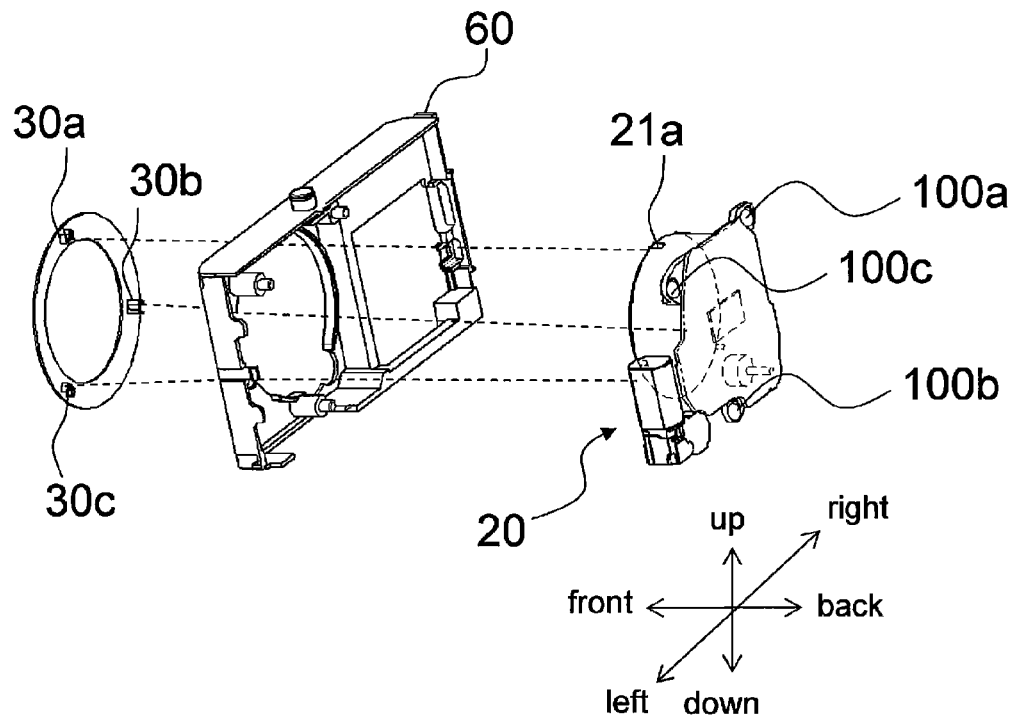
FIG. 8 is a diagram illustrating a method for assembling a lens barrel 20 according to the first embodiment.

Then, as shown in FIG. 8, the lens panel 30 is mounted from the front of the frame 60. Here, the first to third convex portions 30a to 30c of the lens panel 30 are mated with the first to third concave portions 21a to 21c of the lens barrel 20 (only the first concave portion 21a is shown in FIG. 8). This determines the up-down and left-right position of the lens barrel 20.

Figure 9:
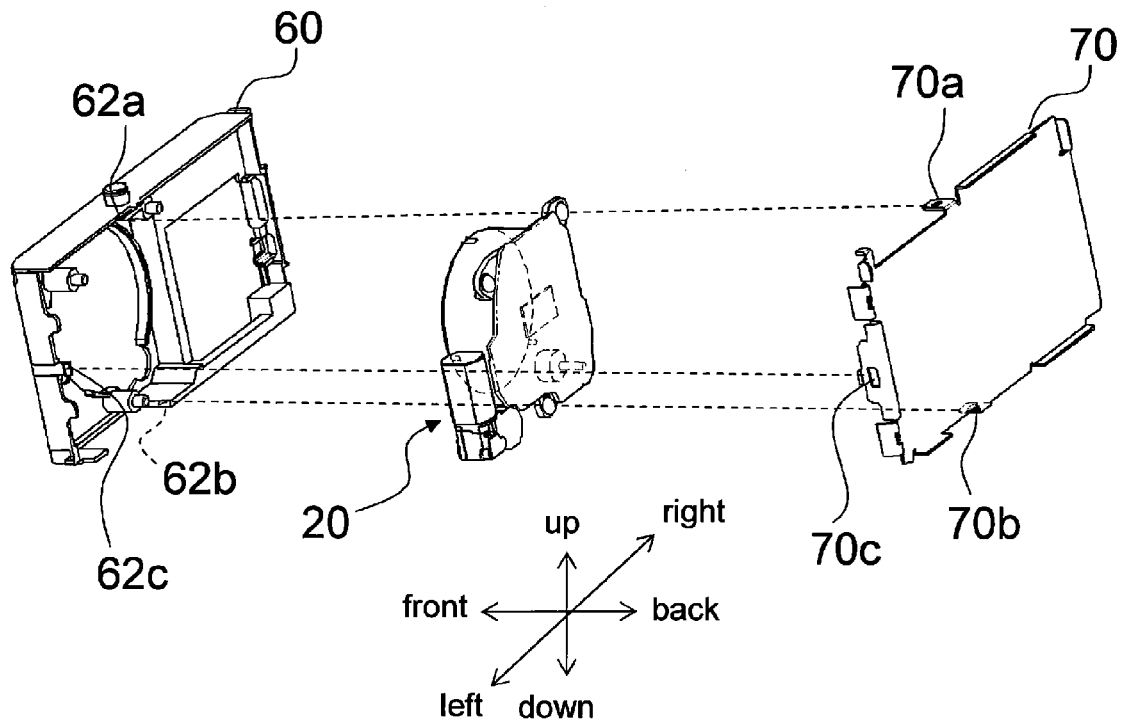
FIG. 9 is a diagram illustrating a method for assembling a lens barrel 20 according to the first embodiment.

Then, as shown in FIG. 9, the inner face (front face) of the frame plate 70 is brought into contact with the first to third rubber caps 100a to 100c, while the first to third linking prongs 62a to 62c of the frame 60 are connected to the first to third linking holes 70a to 70c of the frame plate 70. This results in a state in which the lens barrel 20 is supported by the frame plate 70 via the first to third rubber caps 100a to 100c, and determines the rear position of the lens barrel 20.

Actions and Effects (1) The digital camera 1 according to the first embodiment has the second rubber cap 100b disposed between the lens barrel 20 and the frame 60 (an example of a "first member"), and between the lens barrel 20 and the frame plate 70 (an example of a "second member"). The second rubber cap 100b is fixed to the frame 60, and comes into contact with the frame plate 70.

Thus, the lens barrel 20 is supported by being sandwiched between the frame 60 and the frame plate 70 via the second rubber cap 100b. Therefore, there is no need for the second rubber cap 100b to be screwed in place, so the lens barrel 20 can be assembled with less work. Also, since the second rubber cap 100b is brought into direct contact with the frame plate 70, there is no need to provide a gap between the frame plate 70 and the second rubber cap 100b as is the case when screws are used. Therefore, the size of the digital camera 1 can be reduced.

Also, since the second rubber cap 100b is inserted between the lens barrel 20 and the frame 60, and between the lens barrel 20 and the frame plate 70, not only is less external force exerted on the lens barrel 20 in the front-back direction, but less external force in the up-down and left-right directions is directly transmitted to the frame 60 and the frame plate 70. Accordingly, the internal structure of the digital camera 1 is less apt to be damaged.

Furthermore, since the second rubber cap 100b is inserted between the lens barrel 20 and the frame 60, less mechanical noise of the lens barrel 20 is directly transmitted to the frame 60. Accordingly, the mechanical noise of the lens barrel 20 is less apt to be picked up by the microphone 40.

The above effects are not limited to just the second rubber cap 100b, and can also be obtained with the first and third rubber caps 100a and 100c.

(2) The frame 60 has the second boss pin 61b (one example of a "projection") that extends toward the frame plate 70 side. The lens barrel 20 has the second attachment portion 22b (one example of an "annular portion") that surrounds the second boss pin 61b. The second rubber cap 100b has the constricted portion 120, which is fitted on the inside of the second attachment portion 22b, and the insertion hole 140, into which the distal end portion 210 is inserted.

Therefore, in assembling the lens barrel 20, the second rubber cap 100b and the second boss pin 61b of the frame 60 can be easily connected. This is particularly effective when it is not possible to visually confirm the job of inserting the second boss pin 61b into the insertion hole 140 of the second rubber cap 100b.

Also, since the second boss pin 61b is surrounded by the second attachment portion 22b via the second rubber cap 100b, the external force exerted on the lens barrel 20 in the up-down and left-right directions is absorbed by the second rubber cap 100b, and can be taken up by the second boss pin 61b. Accordingly, the internal structure of the digital camera 1 is even less apt to be damaged, and the second rubber cap 100b is less apt to be damaged.

(3) The frame 60 is formed near the second boss pin 61b, and has the second linking prong 62b (one example of a "locking portion") that is connected to the frame plate 70.

Thus the frame 60 and the frame plate 70 are linked near the second boss pin 61b, so movement of the second rubber cap 100b away from the second boss pin 61b is suppressed.

(4) The first linking prong 62a is disposed in the center of the frame 60 in the long-side direction (that is, the left-right direction) of the frame plate 70.

Thus, the frame 60 and the frame plate 70 are linked at a location where a gap is likely to be created by bending of the frame plate 70, so movement of the first rubber cap 10 away from the first boss pin 61a is effectively suppressed.

(5) The lens panel 30 (an example of an "annular ornament") restricts movement of the lens barrel 20 in a direction perpendicular to the optical axis AX.

Specifically, since the up-down and left-right position of the lens barrel 20 is determined by the lens panel 30, external force exerted on the lens barrel 20 in the up-down and left-right directions will have less effect on the frame 60. Also, when external force is exerted on the lens barrel 20 in the up-down and left-right directions, this makes it less likely that the lens barrel 20 will interfere with the lens panel 30. Accordingly, it is less likely that movement of the lens group 23 will be blocked by the lens panel 30.

(6) The lens panel 30 has the three first to third convex portions 30a to 30c (an example of "first restrictors") formed on the opposing face 30S. The lens barrel 20 has the three first to third concave portions 21a to 21c (an example of "second restrictors") that mate with the three first to third convex portions 30a to 30c.

Thus the up-down and left-right position of the lens barrel 20 is determined at three places, so the lens barrel 20 can be fixed so that it is balanced in the up-down and left-right directions.

Second Embodiment

Figure 10:
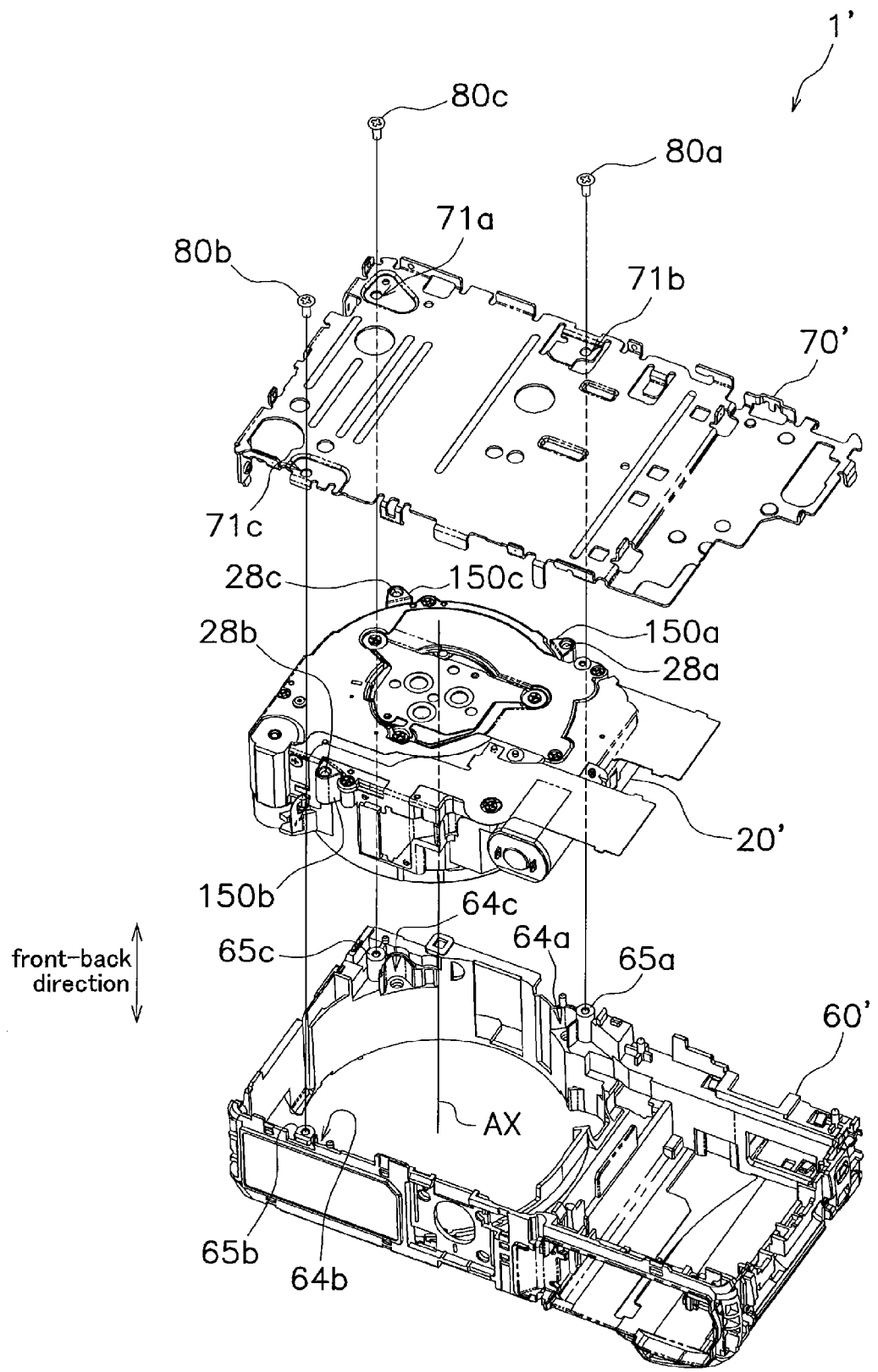
FIG. 10 is an exploded view of the internal configuration of a digital camera according to a second embodiment.
Figure 11:
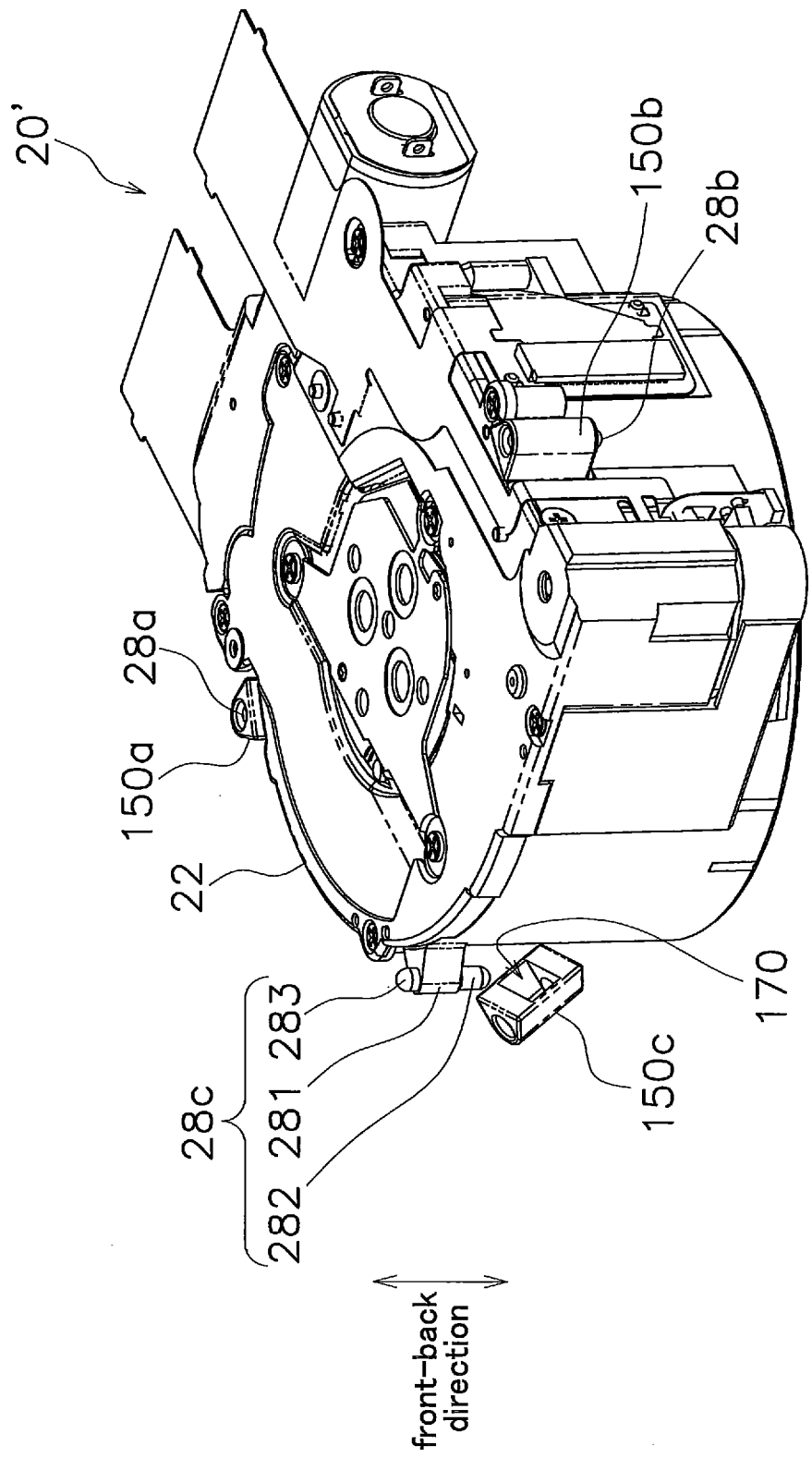
FIG. 11 is an oblique view of the lens barrel according to the second embodiment.

A digital camera according to a second embodiment of the present invention will now be described through reference to FIGS. 10 to 12. FIG. 10 is an exploded oblique view of the internal configuration of the digital camera 1' according to the second embodiment. FIG. 11 is a detail oblique view of the configuration of the lens barrel 20 according to the second embodiment.

As shown in FIG. 10, the digital camera 1' comprises a lens barrel 20', a frame 60', a frame plate 70', first to third rubber caps 150a to 150c, and first to third screws 80a to 80c.

The lens barrel 20' is sandwiched between the frame 60' and the frame plate 70'. As shown in FIG. 11, the lens barrel 20' has first to third attachment portions 28a to 28c provided to the fixing frame 22.

The first to third attachment portions 28a to 28c are rod-shaped members provided along the front-back direction. The first to third rubber caps 150a to 150c are attached to the first to third attachment portions 28a to 28c, respectively. The first to third attachment portions 28a to 28c are each made up of a linking portion 281, a front end convex portion 282 (an example of a "first convex portion"), and a rear end convex portion 283 (an example of a "second convex portion"). FIG. 11 shows a state in which the third rubber cap 150c has been removed from the third attachment portion 28c, and just the external appearance of the third attachment portion 28c is shown. As shown in FIG. 11, the linking portions 281 are connected to the side surface of the main body of the fixing frame 22. In the alternative, for example, the linking portion 281 can be integrally formed with the main body as a one-piece, unitary member. The front end convex portions 282 protrude in front of the linking portions 281, and the rear end convex portions 283 protrude behind the linking portions 281. The configuration of the first to third attachment portions 28a to 28c will be discussed below.

As shown in FIG. 10, the frame 60' comprises first to third insertion recesses 64a to 64c, and first to third boss holes 65a to 65c.

The first to third insertion recesses 64a to 64c are disposed substantially equidistantly spaced apart around the optical axis AX, that is, at positions that are separated by 120° each around the optical axis AX. The first to third rubber caps 150a to 150c attached to the fixing frame 22 are inserted into the first to third insertion recesses 64a to 64c.

The first to third boss holes 65a to 65c are adjacent to the first to third insertion recesses 64a to 64c. Therefore, the first to third boss holes 65a to 65c are also disposed substantially equidistantly spaced apart around the optical axis AX. The first to third screws 80a to 80c are press-fitted into the first to third boss holes 65a to 65c.

The frame plate 70' has first to third insertion holes 71a to 71c to which the first to third screws 80a to 80c are inserted. The first to third insertion holes 71a to 71c are formed at positions corresponding to the first to third boss holes 65a to 65c in the front-back direction.

The first to third rubber caps 150a to 150c are attached to the first to third attachment portions 28a to 28c of the lens barrel 20'. Holding spaces 170 for holding the linking portions 281 are formed in the interior of the first to third rubber caps 150a to 150c. The configuration of the first to third rubber caps 150a to 150c will be described in detail below.

The first to third screws 80a to 80c are inserted from the rear of the frame plate 70' into the first to third insertion holes 71a to 71c, and press-fitted into the first to third boss holes 65a to 65c of the frame 60'.

Attachment Structure of Rubber Caps 150

The attachment structure of the rubber caps 150 will now be described through reference to the drawings. FIG. 12 is a cross section of the internal configuration of the digital camera 1'. FIG. 12 is a cross section that passes through the optical axis AX and the center axis of the first attachment portion 28a.

The first to third rubber caps 150a to 150c each have the same configuration, so just the first rubber cap 150a will be described below. Similarly, the first to third attachment portions 28a to 28c each have the same configuration, so just the first attachment portion 28a will be described below.

The first attachment portion 28a, as mentioned above, is made up of the linking portion 281, the front end convex portion 282, and the rear end convex portion 283. The linking portion 281, the front end convex portion 282, and the rear end convex portion 283 are formed integrally, and with an overall rod shape.

Figure 12:
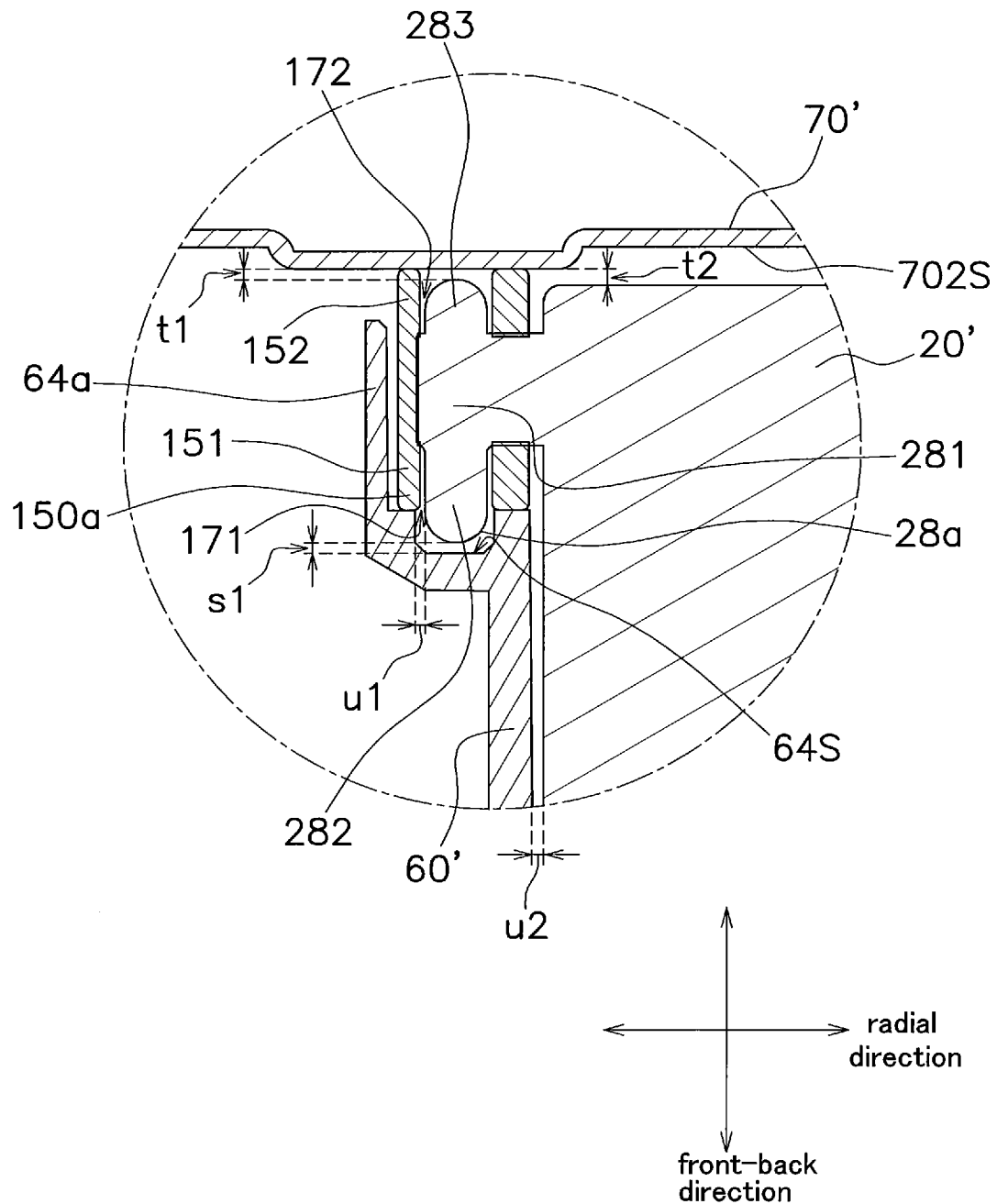
FIG. 12 is a cross section of the internal configuration of the digital camera 1 according to the second embodiment.

As shown in FIG. 12, the first rubber cap 150a is formed in a cylindrical shape, and has a front end cylinder 151 and a rear end cylinder 152. A front insertion hole 171 (an example of a "first insertion hole" or "first opening"), in which the front end convex portion 282 of the first attachment portion 28a is inserted, is formed in the front end cylinder 151. A rear insertion hole 172 (an example of a "second insertion hole" or "second opening"), in which the rear end convex portion 283 of the first attachment portion 28a is inserted, is formed in the rear end cylinder 152. The front insertion hole 171 and the rear insertion hole 172 are each connected to the holding space 170 (see FIG. 11) that holds the linking portion 281.

As shown in FIG. 12, the first attachment portion 28a here is supported by the first rubber cap 150a, and is therefore separated from the frame 60' and the frame plate 70'.

More specifically, the front end convex portion 282 of the first attachment portion 28a has a gap s1 between itself and the bottom face 64S of the first insertion recess 64a of the frame 60'. The gap s1 is smaller than a gap s2 (not shown in FIG. 12; see FIG. 4) in the front-back direction between the main body of the lens barrel 20' and the inner face of the frame 60'.

The rear end convex portions 283 of the first attachment portion 28a has a gap t1 between itself and the inner face 70S of the frame plate 70'. The gap t1 is smaller than a gap t2 in the front-back direction between the lens barrel 20' and the inner face 70S of the frame plate 70'.

Also, the first rubber cap 150a has a gap u1 between itself and the inside face of the frame 60' in the radial direction around the optical axis A. The gap u1 is smaller than a gap u2 in the radial direction of the optical axis A between the lens barrel 20' and the frame 60'.

Actions and Effects (1) In the second embodiment, as discussed above, the first attachment portion 28a is made up of the linking portion 281, the front end convex portion 282, and the rear end convex portion 283. The first rubber cap 150a is formed in a cylindrical shape, and has a holding space 170 for holding the linking portion 281, a front insertion hole 171 in which the front end convex portion 282 is inserted, and a rear insertion hole 172 in which the rear end convex portion 283 is inserted.

Therefore, in assembling the first rubber cap 150a, the first attachment portion 28a can be covered with the first rubber cap 150a, so the first rubber cap 150a can be easily attached to the lens barrel 20'.

Also, the first rubber cap 150a is disposed so as to cover the outside of the first attachment portion 28a. Accordingly, even if the first rubber cap 150a should be compressed and deform, this deformation of the first rubber cap 150a will tend not to cause a shift in the position of the lens barrel 20'.

(2) The gap s1 between the frame 60' and the front end convex portion 282 of the first attachment portion 28a is smaller than the gap s2 between the frame 60' and the main body of the lens barrel 20'.

Therefore, when external force is exerted on the digital camera 1', the front end convex portions 282 come into contact with the frame 60', and the main body is less likely to hit the frame 60'.

(3) The gap t1 between the frame plate 70' and the rear end convex portion 283 of the first attachment portion 28a in the front-back direction is smaller than the gap t2 between the frame plate 70' and the main body of the lens barrel 20'.

Therefore, when external force is exerted on the digital camera 1', the rear end convex portions 283 come into contact with the frame plate 70', and the main body is less likely to hit the frame plate 70'.

(4) The gap u1 between the first rubber cap 150a and the frame 60' in the radial direction is smaller than the gap u2 between the frame 60' and the main body of the lens barrel 20'.

Therefore, when external force is exerted on the digital camera 1', the first rubber cap 150a comes into contact with the frame 60', and the main body is less likely to hit the frame 60'.

Other Embodiments

The present invention is described by the embodiment above, but this should not be interpreted to mean that the text and drawings that form part of this disclosure limit this invention. Various substitute embodiments, working examples, and implementation techniques will probably be obvious to a person skilled in the art from this disclosure.

Figure 13:
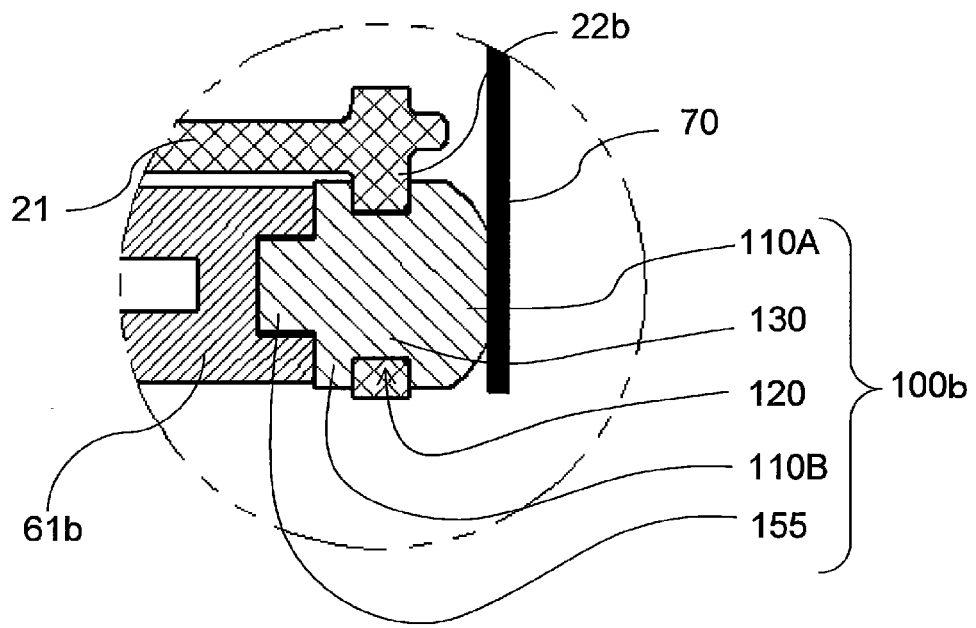
FIG. 13 is a cross section of the configuration of a rubber cap 100.

(A) In the above embodiments, the second rubber cap 100b had the insertion hole 140, but this is not the only option. As shown in FIG. 13, the second rubber cap 100b can not have the insertion hole 140. In this case, the second rubber cap 100b can have a convex portion 155 that is inserted into the second boss pin 61b. This allows the second rubber cap 100b and the second boss pin 61b to be easily connected, so the ease of assembly of the lens barrel 20 can be preserved.

Figure 14:
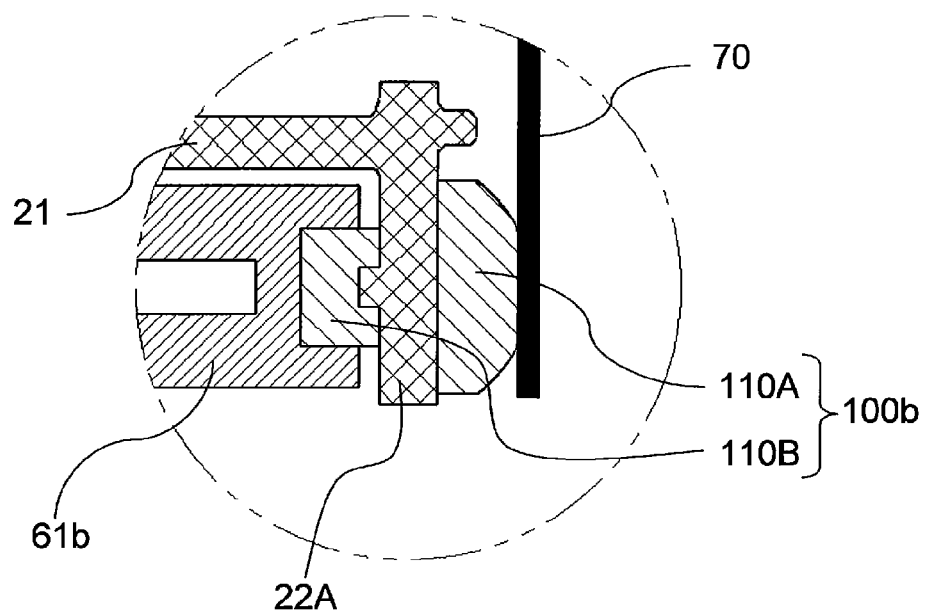
FIG. 14 is a cross section of the configuration of the rubber cap 100.

(B) In the above embodiments, the second rubber cap 100b was made up of a single member, but this is not the only option. The second rubber cap 100b can be made up of a plurality of members. For example, as shown in FIG. 14, if no attachment hole 22S is formed in the second attachment portion 22b of the lens barrel 20, then the second rubber cap 100b can be divided into a first portion 110A and a second portion 110B. Specifically, the second rubber cap 100b need not comprise the constricted portion 120. In this case, the first portion 110A is sandwiched between the frame plate 70 and the second attachment portion 22b (that is, the lens barrel 20). The second rubber cap 100b is fixed to the frame 60, and is sandwiched between the frame 60 and the second attachment portion 22b.

Figure 15:
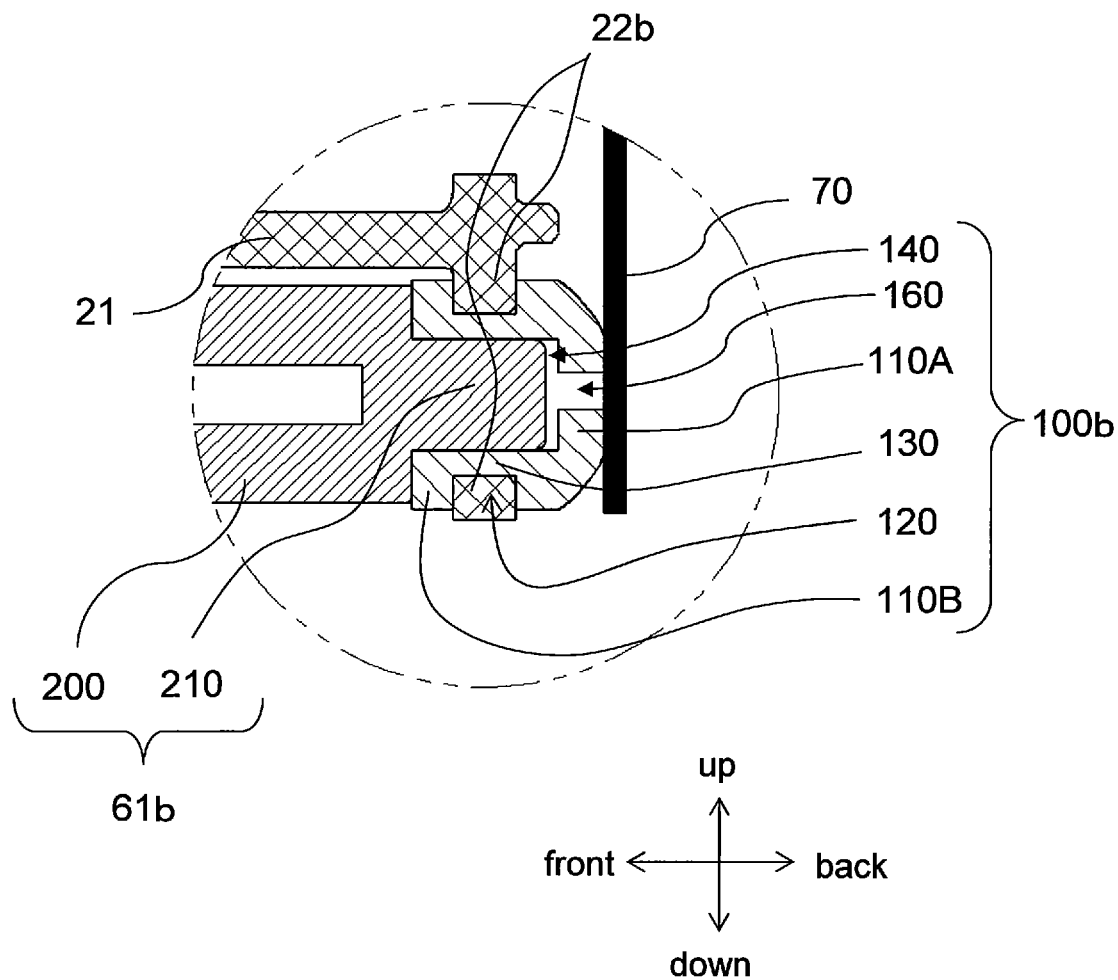
FIG. 15 is a cross section of the configuration of the rubber cap 100.

(C) Although not touched upon in the above embodiments, the second rubber cap 100b can have a through-hole 160 that communicates between the outer surface and the inner surface of the insertion hole 140, as shown in FIG. 15. In this case, the boss pin 61 can be inserted smoothly into the insertion hole 140. Also, the through-hole 160 is preferably formed in the center of the rubber cap 100 along the optical axis AX. This makes it less likely that the elastic balance of the rubber cap 100 itself will be upset.

(D) In the above embodiments, the first to third linking prongs 62a to 62c were described as an example of locking portions, but this is not the only option. The linking portion can be fixed to the frame plate 70 via screws or bolts, so long as they are connected to the frame plate 70.

Thus, the present invention of course includes various embodiments and the like that are not discussed herein. Therefore, the technological scope of the present invention is not limited to just the specific inventions according to the appropriate claims from the descriptions given above.

GENERAL INTERPRETATION OF TERMS

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member" and "element" when used in the singular can have the dual meaning of a single part or a plurality of parts.

The term "configured" as used herein to describe a component, section, or part of a device includes hardware and/or software that is constructed and/or programmed to carry out the desired function.

The terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An imaging device comprising:
a first member defining a lens hole;
a flat second member disposed opposite to the first member;
a lens barrel disposed between the first and second members, the lens barrel including a lens group with an optical axis, the lens group being disposed inside of the lens hole when the first member is viewed along the optical axis; and
an elastic member configured to support the lens barrel, the elastic member being disposed between the first and second members, fixed to the lens barrel and the first member, and arranged to come into contact with the second member with no gap between the elastic member and the second member.

2. The imaging device according to claim 1, wherein
the first member has a projection that extends toward the second member,
the lens barrel further includes an annular portion that defines an attachment hole that accommodates the elastic member and surrounds the projection, and
the elastic member has an annular recess and defines an insertion hole that accommodates the projection, the annular recess is formed on the outer peripheral surface of the elastic member and connects the elastic member to the annular portion by way of the attachment hole.

3. The imaging device according to claim 2, wherein
the elastic member defines a through-hole that passes through an outer end surface of the elastic member and communicates with the inner surface of the insertion hole.

4. The imaging device according to claim 3, wherein
the through-hole is formed in the center of the elastic member along the optical axis of the lens group.

5. The imaging device according to claim 1, wherein
the first member has a locking portion formed near the projection and is connected to the second member.

6. The imaging device according to claim 5, wherein
the second member has an oblong shape, and
the locking portion is formed substantially in the center of the first member along the longitudinal direction of the first member.

7. The imaging device according to claim 1, further comprising
an annular ornament disposed on the first member so as to cover the outer edge of the lens hole, wherein
the lens barrel further includes an imaging element, and
the annular ornament is arranged to restrict movement of the lens barrel in a direction perpendicular to the optical axis of the lens group.

8. The imaging device according to claim 7, wherein
the annular ornament has an abutting surface and three first restrictors, the abutting surface is arranged to face the first member, and the three first restrictors are formed on the abutting surface, and
the lens barrel has three second restrictors that respectively mate with the three first restrictors.

9. An imaging device comprising:
a first member defining a lens hole;
a second member disposed opposite to the first member;
a lens barrel disposed between the first and second members, the lens barrel including a lens group with an optical axis, and a main body with a linking portion,
the lens group being disposed inside of the lens hole when the first member is viewed along the optical axis,
the linking portion including a first convex portion and a second convex portion, the linking portion attached to a side surface of the main body, the first convex portion extending from the linking portion toward the first member, and the second convex portion extending from the linking portion toward the second member; and
an elastic member configured to support the lens barrel, the elastic member being disposed between the first and second members, abutting the lens barrel and the first member, and arranged to come into contact with the second member,
the elastic member having a cylindrical shape and defining a holding space that has a first opening and a second opening, the holding space accommodating the linking portion;
wherein the first convex portion is inserted into the holding space through the first opening, and the second convex portion is inserted into the holding space through the second opening.

10. The imaging device according to claim 9, wherein
the distance between the first convex portion and the first member along the optical axis is less than the distance between the main body and the first member along the same axial direction.

11. The imaging device according to claim 9, wherein
the distance between the second convex portion and the second member along the optical axis is less than the distance between the main body and the second member along the same axial direction.

12. The imaging device according to claim 9, wherein the distance between the first convex portion and the first member along the radial direction of the lens group is less than the distance between the main body and the first member along the same radial direction.

13. The imaging device according to claim 9, wherein the linking portion is integrally formed with the main body as a one-piece, unitary member.

14. An imaging device comprising:
a first member defining a lens hole, and including a plurality of connection portions;
a second member disposed opposite to the first member;
a lens barrel disposed between the first and second members, the lens barrel including a lens group with an optical axis, and a plurality of holding portions,
the lens group being disposed inside of the lens hole when the first member is viewed along the optical axis, and
each holding portion facing one of the plurality of connection portions, respectively; and
an elastic member configured to support the lens barrel, the elastic member being disposed between the first and second members, abutting the lens barrel and the first member, and arranged to come into contact with the second member with no gap between the elastic member and the second member;
wherein the elastic member is held by the holding portions and the connection portions.

15. The imaging device according to claim 14, wherein the first member has a projection that extends toward the second member,
the lens barrel further includes an annular portion that defines an attachment hole that accommodates the elastic member and surrounds the projection, and
the elastic member has an annular recess and defines an insertion hole that accommodates the projection, the annular recess is formed on the outer peripheral surface of the elastic member and connects the elastic member to the annular portion by way of the attachment hole.

16. The imaging device according to claim 15, wherein the elastic member defines a through-hole that passes through an outer end surface of the elastic member and communicates with the inner surface of the insertion hole.

17. The imaging device according to claim 16, wherein the through-hole is formed in the center of the elastic member along the optical axis of the lens group.

18. The imaging device according to claim 14, wherein the first member has a locking portion formed near the projection and is connected to the second member.

19. The imaging device according to claim 18, wherein the second member has an oblong shape, and
the locking portion is formed substantially in the center of the first member along the longitudinal direction of the first member.

20. The imaging device according to claim 14, further comprising
an annular ornament disposed on the first member so as to cover the outer edge of the lens hole, wherein
the lens barrel further includes an imaging element, and
the annular ornament is arranged to restrict movement of the lens barrel in a direction perpendicular to the optical axis of the lens group.

21. The imaging device according to claim 20, wherein the annular ornament has an abutting surface and three first restrictors, the abutting surface is arranged to face the first member, and the three first restrictors are formed on the abutting surface, and
the lens barrel has three second restrictors that respectively mate with the three first restrictors.

* * * * *